US009523761B1

(12) United States Patent
Hoffmann et al.

(10) Patent No.: US 9,523,761 B1
(45) Date of Patent: Dec. 20, 2016

(54) GEOLOCATION WITH REDUNDANT AIRCRAFT ANTENNAS SYSTEM AND RELATED METHOD

(71) Applicant: Rockwell Collins, Inc., Cedar Rapids, IA (US)

(72) Inventors: Theodore J. Hoffmann, Hiawatha, IA (US); Mark M. Mulbrook, Marion, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 358 days.

(21) Appl. No.: 14/186,195

(22) Filed: Feb. 21, 2014

(51) Int. Cl.
*G01S 5/06* (2006.01)
*G01S 5/02* (2010.01)
*G01S 5/00* (2006.01)

(52) U.S. Cl.
CPC .. *G01S 5/06* (2013.01); *G01S 5/02* (2013.01); *G01S 5/0205* (2013.01)

(58) Field of Classification Search
CPC .............. G01S 5/02; G01S 5/04; G01S 5/06; G01S 11/02; G01S 11/04; G01S 11/06; G01W 1/16; G01W 1/02; G01R 29/08; G01R 29/0807; G01R 29/0814; G01R 29/0842; B64D 45/02
See application file for complete search history.

(56) References Cited

U.S. PATENT DOCUMENTS

| | | | | |
|---|---|---|---|---|
| 3,940,700 A * | 2/1976 | Fischer | ............... | G01R 29/0814 340/600 |
| 4,339,755 A * | 7/1982 | Wright | .................... | G01S 11/04 342/458 |
| 4,393,382 A * | 7/1983 | Jones | ...................... | G01S 11/04 342/13 |
| 7,171,308 B2 * | 1/2007 | Campbell | ............... | G01W 1/16 702/4 |
| 7,266,455 B2 * | 9/2007 | Kahkoska | ............... | G01W 1/16 702/182 |
| 7,511,467 B2 * | 3/2009 | Jantunen | ............ | G01R 29/0842 324/72 |
| 7,515,087 B1 * | 4/2009 | Woodell | .................. | G01W 1/02 342/175 |
| 7,634,321 B2 * | 12/2009 | Jantunen | ................. | G01W 1/16 324/612 |
| 7,772,826 B2 * | 8/2010 | Jantunen | ............ | G01R 29/0842 324/72 |
| 8,878,698 B2 * | 11/2014 | Georgeson | ............. | B64D 45/02 340/945 |

* cited by examiner

*Primary Examiner* — Bernarr Gregory
(74) *Attorney, Agent, or Firm* — Angel N. Gerdzhikov; Donna P. Suchy; Daniel M. Barbieri

(57) ABSTRACT

A system and method is disclosed for using two or more currently installed antenna elements on a vehicle for geolocation of a remote emitter. Redundant antenna elements initially installed for a non-geolocation purpose are employed to receive signals from the remote emitter. A splitter is used to tap from the received signal where the content of the received signal, if desired, is available to a non-geolocation receiver for which the antenna element was originally designed. The splitter transmits the split portion of the signal to a geolocation sensing receiver for signal processing based on a two or more antenna element geolocation solution.

24 Claims, 11 Drawing Sheets

GEOLOCATION WITH REDUNDANT AIRCRAFT ANTENNAS SYSTEM AND RELATED METHOD

FIELD OF THE INVENTION

The present invention relates generally to location of an emitter based on a received signal from the emitter. More particularly, embodiments of the present invention relate to a system and related method for geolocation of an emitter using existing antenna elements onboard a vehicle.

BACKGROUND

Modern vehicles may include a plurality of antennas and probes. These protrusions add additional drag to the vehicle, increase the potential for fluid transfer through the hull of the vehicle, decrease the structural integrity of the hull of the vehicle, and are prone to breakage. In the case an aircraft vehicle, the pressure differential between ambient and internal may increase the potential for fluid transfer with each hull orifice. Many systems require redundant antenna installations to ensure safety, reliability, and/or availability. For example, an aircraft vehicle may be required to maintain two to three VHF antenna elements mounted external to the aircraft skin. Regulatory requirements may demand at least two of these elements be operational before flight to ensure redundant VHF capability.

Additional systems and initiatives (Next Generation Air Transportation System (NextGen), Systems Engineering 2020 (SE-2020), Single European Sky ATM Research (SESAR)) are pushing for additional systems which may require additional antennas and receivers. Conversely operators are desirous to reduce drag and weight to reduce fuel costs and boost profits. Each of these additional systems requires an undesirable additional antenna or multiple antennas mounted to the external of the vehicle.

Antenna addition to a vehicle may include factors which increase cost, decrease structural integrity, and decrease vehicle performance. For example, regulatory requirements for antenna addition to an aircraft may prove time consuming and costly. An additional penetration of the skin of an aircraft may require additional structure to maintain the integrity of the pressure hull.

Each skin penetration of a vehicle may degrade a performance capability of the vehicle. For example, a penetration of a pressure hull of an aircraft may have long term adverse effects on structural integrity over the lifetime of the pressure hull. In addition, each penetration of the aircraft pressure hull may require exhaustive testing and evaluation combined with regulatory approval before an operator may execute the additional skin penetration.

Each additional antenna placement may further degrade performance of the vehicle. For example, an additional antenna placed external to the hull of an aircraft may increase parasitic drag leading to increased fuel burn, decreased range and ceiling, and decreased overall performance of the aircraft. Further, additional cables routed from antenna elements through the aircraft to avionics systems increase overall weight and reduce aircraft performance.

Traditionally, phase ambiguity (N) has been resolved by using more than one baseline (three or more antennas) where the baseline differences are less than or equal to half of the signal wavelength. These traditional methods may typically use progressive unambiguous baseline difference combinations to ultimately resolve the ambiguity number of the longest (most accurate) baseline. These traditional methods suffer from the requirement of multiple antennas to accomplish accurate resolution of the ambiguity number.

In addition, cosite interference between antenna elements may preclude optimal operation of the antenna reception. As additional antenna elements may be installed, undesirable additional interference may preclude original antenna performance.

Therefore, a need remains for a system and related method enabling currently installed antenna elements to receive and analyze an RF signal creating the novel ability to relatively locate the transmitter of the RF signal.

SUMMARY

Accordingly, a preferred embodiment of the present invention is directed to a method for geolocation using currently mounted antenna elements onboard a vehicle, comprising: receiving a radio frequency (RF) signal from a remote emitter, the receiving via at least a first antenna element mounted on the vehicle and a second antenna element mounted on the vehicle, each of the first and second antenna elements configured for a function other than geolocation, the first antenna element and the second antenna element configured for at least one of: transmit and receive of a content of the RF signal, splitting a first antenna element received RF signal into a first element existing waveform signal and a first element location signal, the first element existing waveform signal maintaining the content of the received RF signal, splitting a second antenna element received RF signal into a second element existing waveform signal and a second element location signal, the second element existing waveform signal maintaining the content of the received RF signal, transmitting the first and second element location signals to a geolocation sensing receiver, determining, within the geolocation sensing receiver, a geolocation solution for the remote emitter based on the first element location signal and the second element location signal, and displaying the geolocation solution to an operator of the vehicle.

An additional embodiment of the present invention is directed to a method wherein the vehicle is an aircraft and the function other than geolocation includes at least one of: communication, navigation, and surveillance.

An additional embodiment of the present invention is directed to a method wherein determining a geolocation solution for the remote emitter further includes combining a geolocation solution from a first vehicle with a geolocation solution from at least one additional vehicle to create a third geolocation solution.

An additional embodiment of the present invention is directed to a method wherein the at least one additional vehicle includes one of: a ground based vehicle, a space based vehicle, and an airborne vehicle.

An additional embodiment of the present invention is directed to a method wherein the remote emitter includes at least one of: a remote vehicle, a lightning strike, and a remote ground based emitter.

An additional embodiment of the present invention is directed to a method wherein splitting the first and second antenna element received RF signal into a first and second element existing waveform signal and a first and second element location signal further includes at least one of an analog to digital conversion and a digital to analog conversion.

An additional embodiment of the present invention is directed to a method wherein the first antenna element received RF signal is a direct signal from the remote emitter and the second antenna element received RF signal is a reflected signal from a known reflector.

An additional embodiment of the present invention is directed to a method wherein the known reflector is one of: an ionosphere, a surface of the earth, and a body of water.

An additional embodiment of the present invention is directed to a method further comprising reception of a time reference and wherein determining the geolocation solution for the remote emitter is based on a combination of a phase interferometry solution and a time distance of arrival (TDOA) calculation.

An additional embodiment of the present invention is directed to a method wherein the geolocation solution for the remote emitter based on the first and second element location signals is determined by at least one of: 1) a relative angle of arrival of the received RF signal based on resolving a phase ambiguity associated with a phase difference between first element location signal and the second element location signal at two distinct frequencies, 2) a range based on a difference between a relative angle of arrival at a first time and a relative angle of arrival at a second time, 3) a Frequency Difference of Arrival calculation, 4) a Doppler Difference of Arrival calculation, 5) a Phase Interferometer calculation, 6) a Frequency Difference Interferometer calculation, 7) a SPECTMUR calculation, 8) a CEPSTRUM calculation, and 9) a Power Difference of Arrival calculation.

An additional embodiment of the present invention is directed to a method wherein the geolocation solution for the remote emitter based on the first and second element location signals is determined by a combination of at least two of the geolocation solutions.

An additional embodiment of the present invention is directed to a method wherein the remote emitter is at least one ground based emitter, each of the at least one ground based emitter having a known location, and wherein the geolocation sensing receiver is further configured to determine a position of the vehicle based on the received RF signals.

An additional embodiment of the present invention is directed to a method wherein the geolocation sensing receiver is configured for receiving a frequency associated with one of a cloud to cloud lightning strike and a cloud to ground lightning strike.

An additional embodiment of the present invention is directed to a system for geolocation using currently mounted antenna elements onboard a vehicle, comprising: a first antenna element configured for a function other than geolocation, the first antenna element configured for at least one of: transmit and receive of a content of a Radio Frequency (RF) signal, a first splitter configured for splitting a first antenna element received RF signal into a first element existing waveform signal and a first element location signal, the first element existing waveform signal maintaining the content of the received RF signal, the first splitter further configured for transmitting the first element existing waveform signal to a receiver and for transmitting the first element location signal, a second antenna element configured for a function other than geolocation, the second antenna element configured for at least one of: transmit and receive of the content of the RF signal, a second splitter configured for splitting a second antenna element received RF signal into a second element existing waveform signal and a second element location signal, the second element existing waveform signal maintaining the content of the received RF signal, the second splitter further configured for transmitting the second element existing waveform signal to a receiver and for transmitting the second element location signal, a geolocation sensing receiver configured for: receiving each of the first element location signal and the second element location signal, determining a geolocation solution for the remote emitter based on the first element location signal and the second element location signal, and displaying the geolocation solution to an operator of the vehicle.

An additional embodiment of the present invention is directed to a method for geolocation using currently mounted antenna elements onboard a vehicle, comprising: receiving a first radio frequency (RF) signal from a remote emitter at a first time, the first RF signal having a first power, the receiving via at least a first antenna element mounted on the vehicle and a second antenna element mounted on the vehicle, each of the first and second antenna elements configured for a function other than geolocation, the first antenna element and the second antenna element configured for at least one of: transmit and receive of a content of the RF signal, receiving a second RF signal from the remote emitter at a second time, the second RF signal having a second power, transmitting the first RF signal and second RF signal to a geolocation sensing receiver, determining a range from the vehicle to the remote emitter based on a Power Difference of Arrival (PDOA) between the first RF signal and the second RF signal, and displaying the range to an operator of the vehicle.

An additional embodiment of the present invention is directed to a method wherein the first RF signal is a direct signal from a first end of a lightning strike and the second RF signal is a direct signal from a second end of the lightning strike.

An additional embodiment of the present invention is directed to a method wherein determining a range from the vehicle to the remote emitter further includes determining an orientation of the emitter based on a Time Difference of Arrival (TDOA) between the first RF signal and the second RF signal.

An additional embodiment of the present invention is directed to a method for geolocation using currently mounted antenna elements onboard a vehicle, comprising: means for receiving a radio frequency (RF) signal from a remote emitter, each of the receiving means configured for a function other than geolocation, each of the receiving means configured for at least one of: transmit and receive of a content of the RF signal, means for splitting a first antenna element received RF signal into a first element existing waveform signal and a first element location signal, the first element existing waveform signal maintaining the content of the received RF signal, means for splitting a second antenna element received RF signal into a second element existing waveform signal and a second element location signal, the second element existing waveform signal maintaining the content of the received RF signal, means for transmitting the first and second element location signals to a geolocation sensing receiver, means for determining a geolocation solution for the remote emitter based on the first element location signal and the second element location signal, and means for displaying the geolocation solution to an operator of the vehicle.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention may employ antenna elements onboard a vehicle to perform additional functions separate from the originally intended function of the antenna elements. Systems described herein may sense individual Radio Frequency (RF) signals enroute to a desired destination receiver and perform separate function in addition to the content reception of a received RF signal. One embodiment of the present invention may include a system capable of using two or more communication antenna elements previously installed onboard an aircraft to relatively locate an emitter of a received Radio Frequency (RF) signal.

Embodiments of the present invention may capitalize on unused capability in existing vehicle hardware. For example, multiple communication antenna elements mounted on an aircraft may perform additional function with zero or minimal addition of additional equipment.

Although an aircraft vehicle may be one preferred vehicle upon which embodiments of the present invention may find function, it is contemplated herein a plurality of addition vehicle types may benefit using specifically tailored embodiments of the present invention. For example, a ground based vehicle and surface ship may employ embodiments herein for specific purposes. Additionally, a submarine and helicopter may benefit from embodiments of the present invention mounted therein. A user in an aircraft may benefit from one embodiment of the present invention. The aircraft descriptions herein are to be considered a non-limiting example of embodiments of the present invention.

Figure 1:
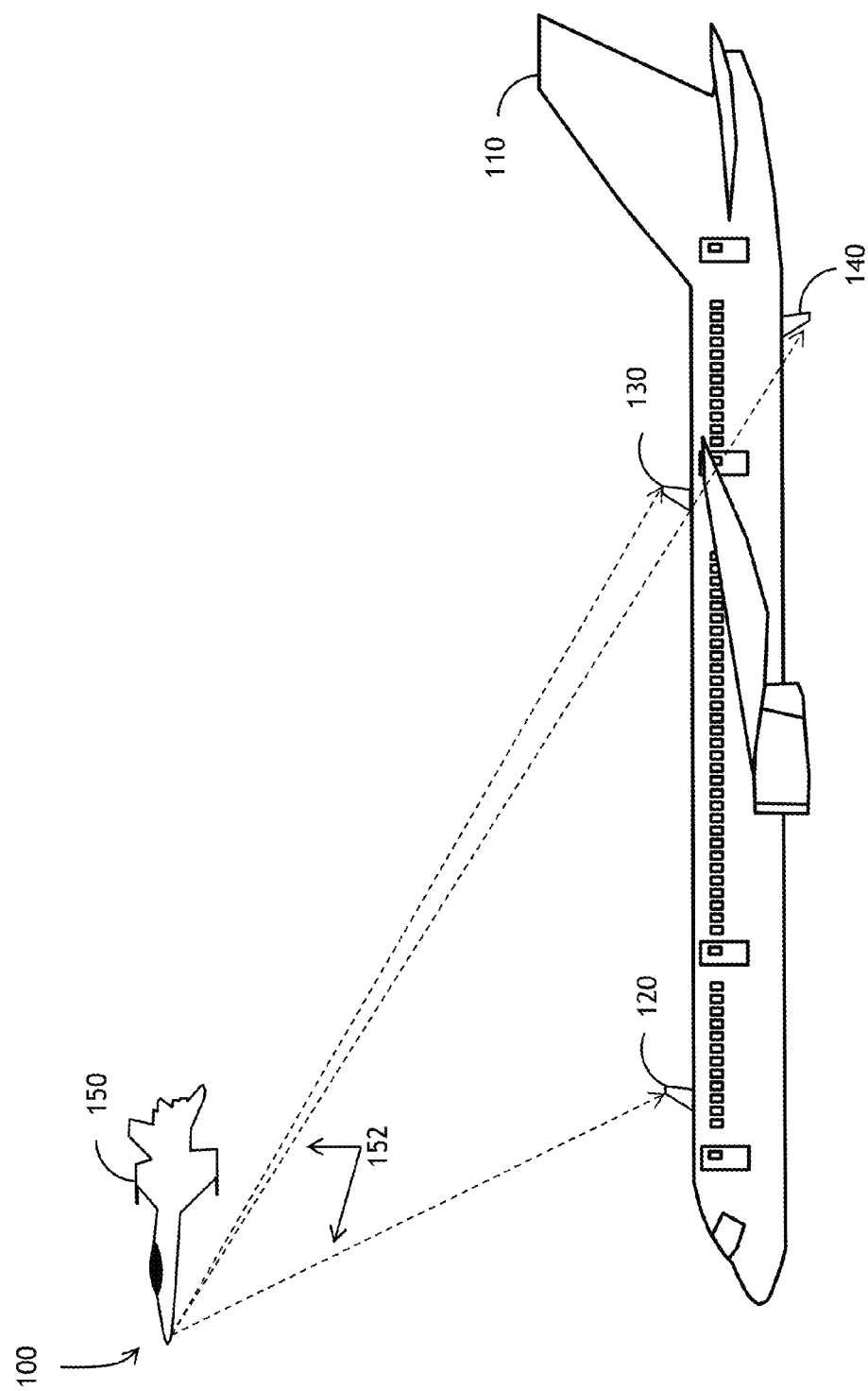
FIG. 1 is a diagram of a remote emitter and a receiving vehicle exemplary of an embodiment of the present invention.

Referring to FIG. 1, a diagram of a remote emitter and a receiving vehicle exemplary of an embodiment of the present invention is shown. Remote emitter 150 may emit an emitter signal 152. Vehicle 110 may be configured with a plurality of antenna elements mounted to an external of the vehicle 110. To operate each of these external antenna elements, a manufacturer/operator of the vehicle 110 is often required to establish with a governing agency the safety and reliability of the externally mounted antenna elements. Here, an exemplary three antenna elements are shown with two upper antenna elements 120 130 and one lower antenna element 140.

The multiple communication antenna elements 120 130 140 coupled with a shared time reference (for example 1 pulse per second signal from a satellite based positioning system or onboard hardwire connected time standard) may be combined to locate the relative position of a transmitter through Time Difference of Arrival (TDOA). Solving for 3 unknowns with 3 linear equations may resolve the relative transmitter's location to that of the receiving antenna elements. For example, multiple Very High Frequency (VHF) transmit receive communication antenna elements mounted externally on an aircraft vehicle 110 may receive a VHF communication signal transmitted from the remote emitter 150. Physical separation between antenna elements may allow for the VHF communication signal to be received at each antenna element at a distinct time (e.g. Time 1 at antenna element 120, Time 2 at antenna element 130, and Time 3 at antenna element 140).

Multiple antenna elements may be present in one or more antenna units or within a single antenna unit. For example, an Electrically Steerable Array (ESA) antenna may be comprised of multiple antenna elements within an ESA panel. Embodiments of the present invention may employ one or more ESA panels as well as traditional antenna elements to perform geolocation operations of an emitter of the RF signal.

Embodiments of the present invention may employ an ESA antenna panel alone or in combination with one or more additional ESA panels and additional mounted antennal elements to enable geolocation of the remote emitter 150 of the RF energy.

In one embodiment, a single ESA panel with a plurality of antenna elements therein may be employed by the present invention to receive the emitter signals 152 and determine a location of the remote emitter 150 based on reception. In an additional embodiment, multiple antenna elements (ESA and traditional RF antenna elements) may be employed by the present invention to receive the RF signal 152 and determine a location of the remote emitter 150.

For example, a non-limiting list of antenna elements usable by embodiments of the present invention may include: a Low Frequency (LF) antenna element such as an Automated Direction Finding (ADF) antenna element, a Very High Frequency (VHF) antenna element designed for voice communication, a High Frequency (HF) antenna designed for communication, a Ultra High Frequency (UHF) antenna element designed for communication, a Terminal Collision Avoidance System (TCAS) antenna element, a Satellite Communications (SATCOM) antenna element, an Instrument Landing System (ILS) antenna element, a satellite based positioning system antenna element such as a Global Positioning System (GPS), a radio altimeter antenna element, a VHF Omnidirectional Range (VOR) antenna element, a localizer antenna element, a glideslope antenna element, a marker beacon antenna element, a Distance Measuring Equipment (DME) antenna element, and the like.

Embodiments of the present invention may also employ more than one traditional communication antenna element onboard the vehicle 110 to enable geolocation of the source of the RF signal. For example, a first traditional VHF antenna element 120 may receive an RF signal 152 from a remote emitter 150 at a first time. A second VHF antenna element 130 may receive the RF signal 152 at a second time. Systems herein may receive each of the VHF signals and, coupled with a time reference generating a TDOA input from each antenna element, determine a relative location of the emitter 150 of the VHF signal.

Figure 2:
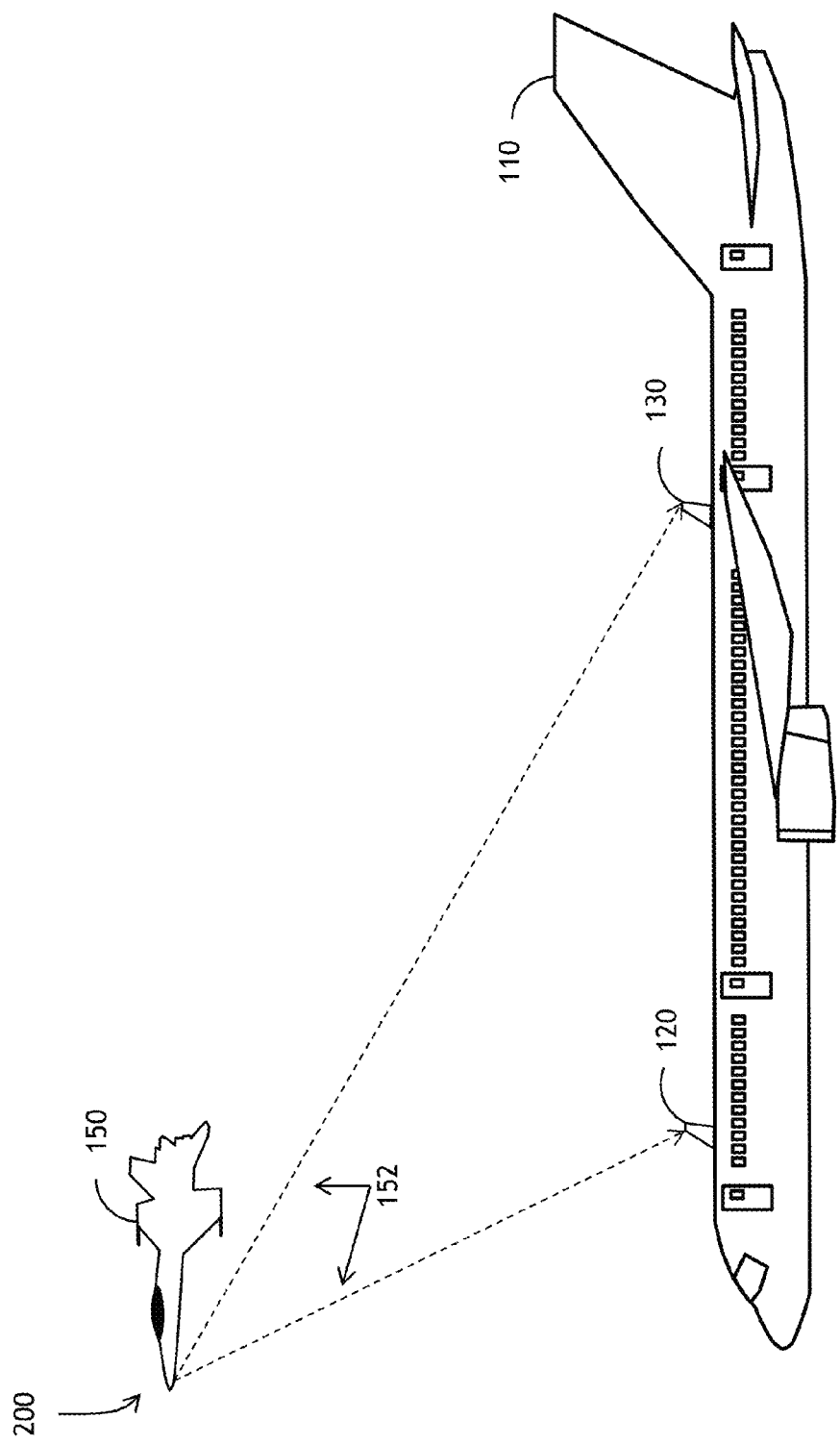
FIG. 2 is a diagram of diagram of a remote emitter and a receiving vehicle exemplary of an embodiment of the present invention.

Referring to FIG. 2, a diagram of diagram of a remote emitter and a receiving vehicle exemplary of an embodiment of the present invention is shown. The present invention may provide a method for resolving the phase ambiguity using frequency differences. U.S. Pat. No. 7,961,147 B1 to VanLaningham teaches long baseline phase interferometer ambiguity resolution using frequency differences between two antennas and is incorporated by reference herein in its entirety.

VanLaningham requires additional undesirable antennas mounted to the external of the vehicle. The present invention may employ ambiguity resolution techniques to determine at least the angle of arrival of the received signal from antenna elements mounted on the vehicle for an original function other than geolocation. Further, the present invention functions with two or more antenna elements even in situations where the baseline length greatly exceeds the signal wavelength.

Figure 3:
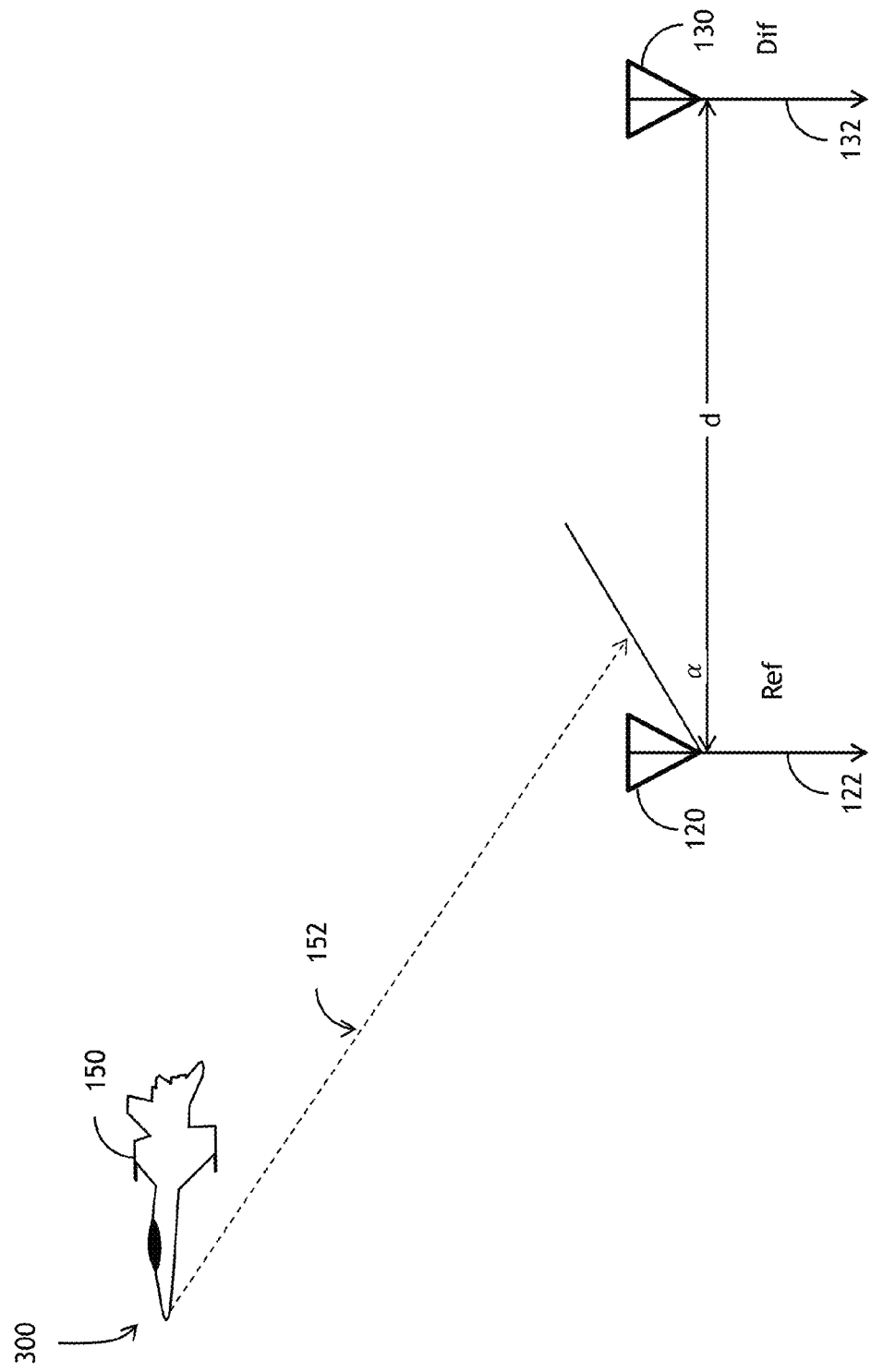
FIG. 3 is a diagram of two antenna elements exemplary of an embodiment of the present invention.

Referring to FIG. 3, a diagram of two antenna elements exemplary of an embodiment of the present invention is shown. Antenna elements 120 and 130 may receive emitter signal 152 from a remote emitter 150 at an angle-of-arrival of $\alpha$ and the two antenna elements are separated by interferometer baseline d (representing the distance between the two antennas).

Figure 4:
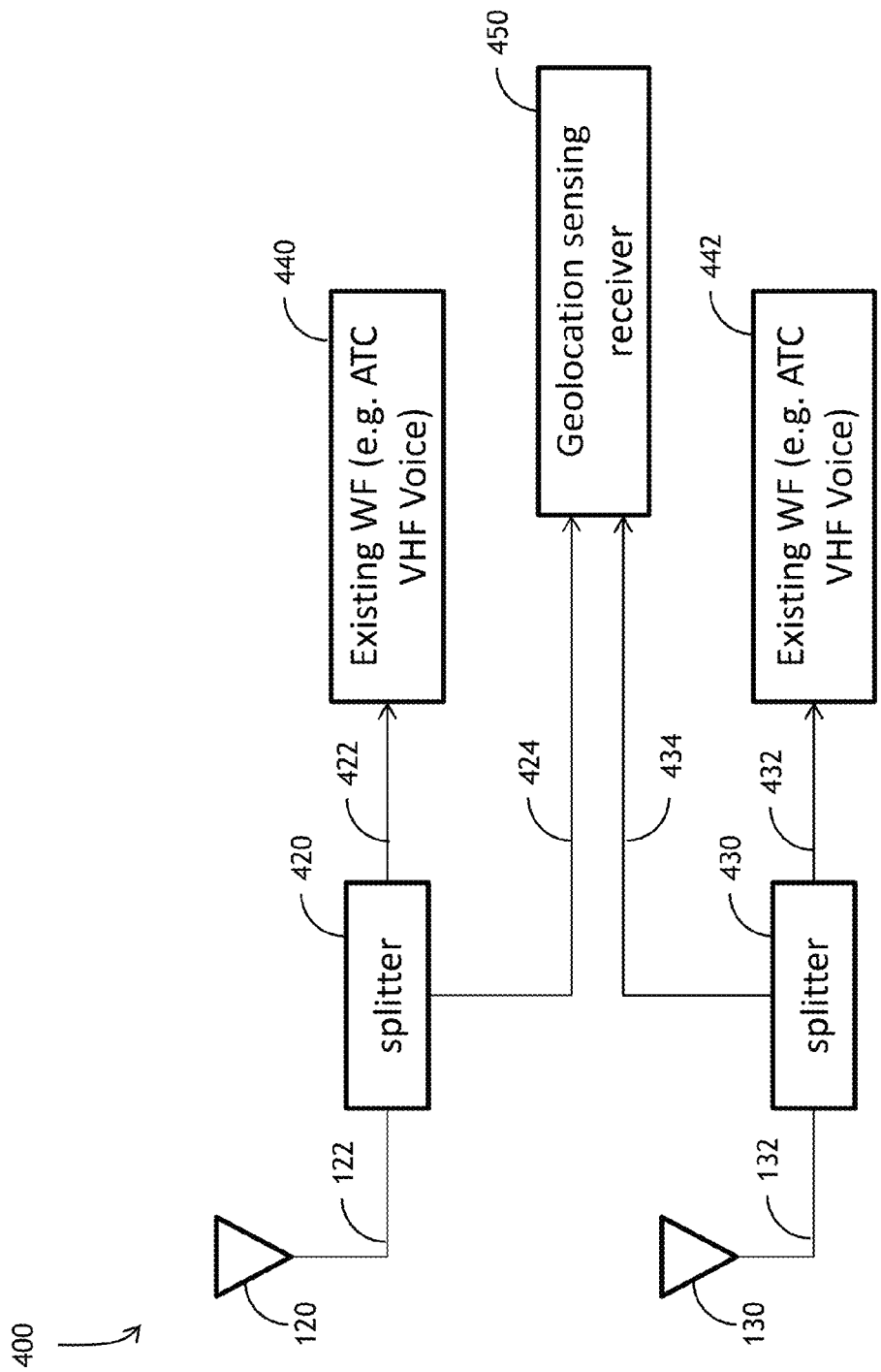
FIG. 4 is a block diagram of a system for geolocation of a remote emitter exemplary of one embodiment of the present invention.

A first channel may be designated as a reference channel, shown as antenna 120 and receiver 440 in FIG. 4. A second channel may be designated as a difference channel, shown as antenna 120 and receiver 442 in FIG. 4.

Wherein the term $N_D$ in equation 1 represents the number of times the phase signal has passed through $2\pi$ when passing from the reference channel 120 to the difference channel 130. This term $N_D$, as used herein, represents the phase ambiguity. The delta phase difference therefore, may be based on the equation:

$$\Delta\Phi_{RD_{01}} = 2\pi(N_{D_0} - N_{D_1}) + 2\pi d \sin(\alpha)\left(\frac{1}{\lambda_0} - \frac{1}{\lambda_1}\right) \quad (1)$$

Wherein two frequencies at wavelengths of $\lambda_0$ and $\lambda_1$ may provide frequency discrimination between the wavelengths. Systems herein may employ two or more previously installed antenna elements to determine a transmitter location by resolving phase ambiguity via unambiguous frequency differences where:

$$d\left(\frac{1}{\lambda_0} - \frac{1}{\lambda_1}\right) \le 1 \quad (2)$$

In addition, low Signal to Noise Ratio (SNR) signals may present a challenge for traditional systems to receive and process. Embodiments of the present invention may function receiving low SNR signals and determining a transmitter location of the low SNR signal. U.S. Pat. No. 7,898,479 to VanLaningham teaches a system and method for signal extraction from a very low SNR for spread spectrum signals based on an angle of arrival of the signals and is incorporated by reference herein in its entirety.

VanLaningham teaches generating a phase difference trajectory based on a signal received at a first and a second antenna. The method extracts a signal by integrating the phase difference trajectory over frequency for a plurality of angles of arrival. Embodiments of the present invention may employ similar signal extraction techniques to determine at least the angle of arrival of the received signal. As above, VanLaningham requires an additional undesirable antenna mounted to the external of the vehicle.

Referring to FIG. 4, a block diagram of a system for geolocation of a remote emitter exemplary of one embodiment of the present invention is shown. Embodiments of the present invention overcome this limitation through use of antenna elements currently installed onboard the vehicle. System 400 may employ two or more previously installed antenna elements to determine a transmitter location by a plurality of techniques including, but not limited to: a resolution of a phase ambiguity via unambiguous frequency differences, a range of the remote emitter based on a difference between a relative angle of arrival at a first time and a relative angle of arrival at a second time, a Frequency Difference of Arrival calculation, a Doppler Difference of Arrival calculation, a Phase Interferometer calculation, a Frequency Difference Interferometer calculation, a SPECTMUR calculation, and a Power Difference of Arrival calculation. Antenna elements first 120 and second 130 receive the emitter signal 152. First splitter 420 splits the received first antenna element received RF signal 122 into a first element existing waveform signal 422 and a first element location signal 424. Should the content of the signal 152 be desirable, the first element existing waveform signal 422 maintains the content of the received RF signal 122 for use by an existing receiver 440.

System 400 further includes a second splitter 430 for splitting a second antenna element received RF signal 132 into a second element existing waveform signal 432 and a second element location signal 434, the second element existing waveform signal 432 also maintains, if desired, the content of the received RF signal 152. Each splitter 420 430 then transmits the first and second element location signals 424 434 to a geolocation sensing receiver 450.

Figure 5:
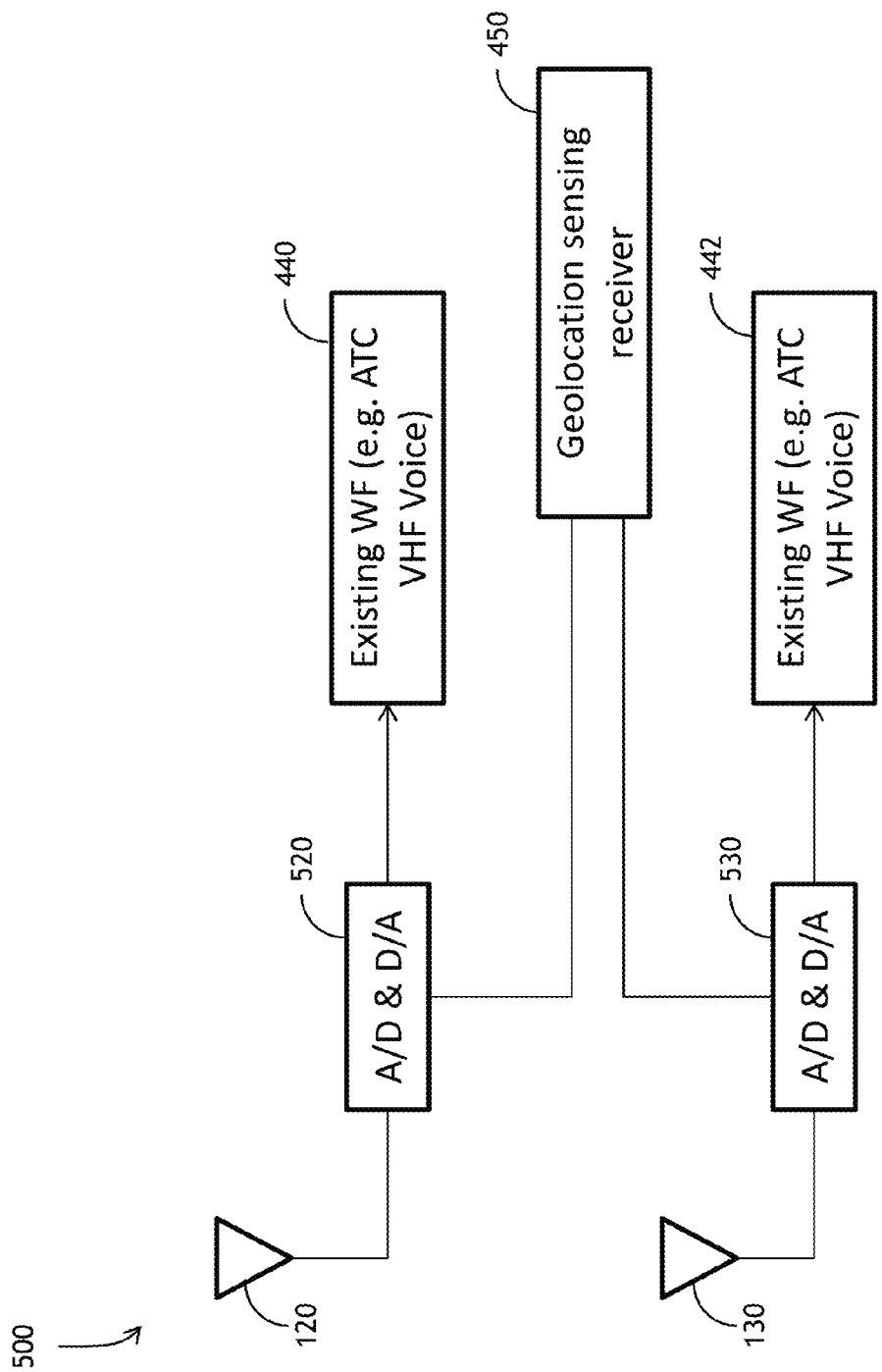
FIG. 5 is a block diagram of a system for geolocation of a remote emitter exemplary of one embodiment of the present invention.

Referring to FIG. 5, a block diagram of a system for geolocation of a remote emitter exemplary of one embodiment of the present invention is shown. In embodiments, a Software defined Radio (SDR) may be employed by system 400 to function within the scope of the present invention. Converters 520 530 may convert an analog signal to digital and digital to analog for use by the existing waveform receiver 440 442 and the geolocation sensing receiver 450.

Figure 6:
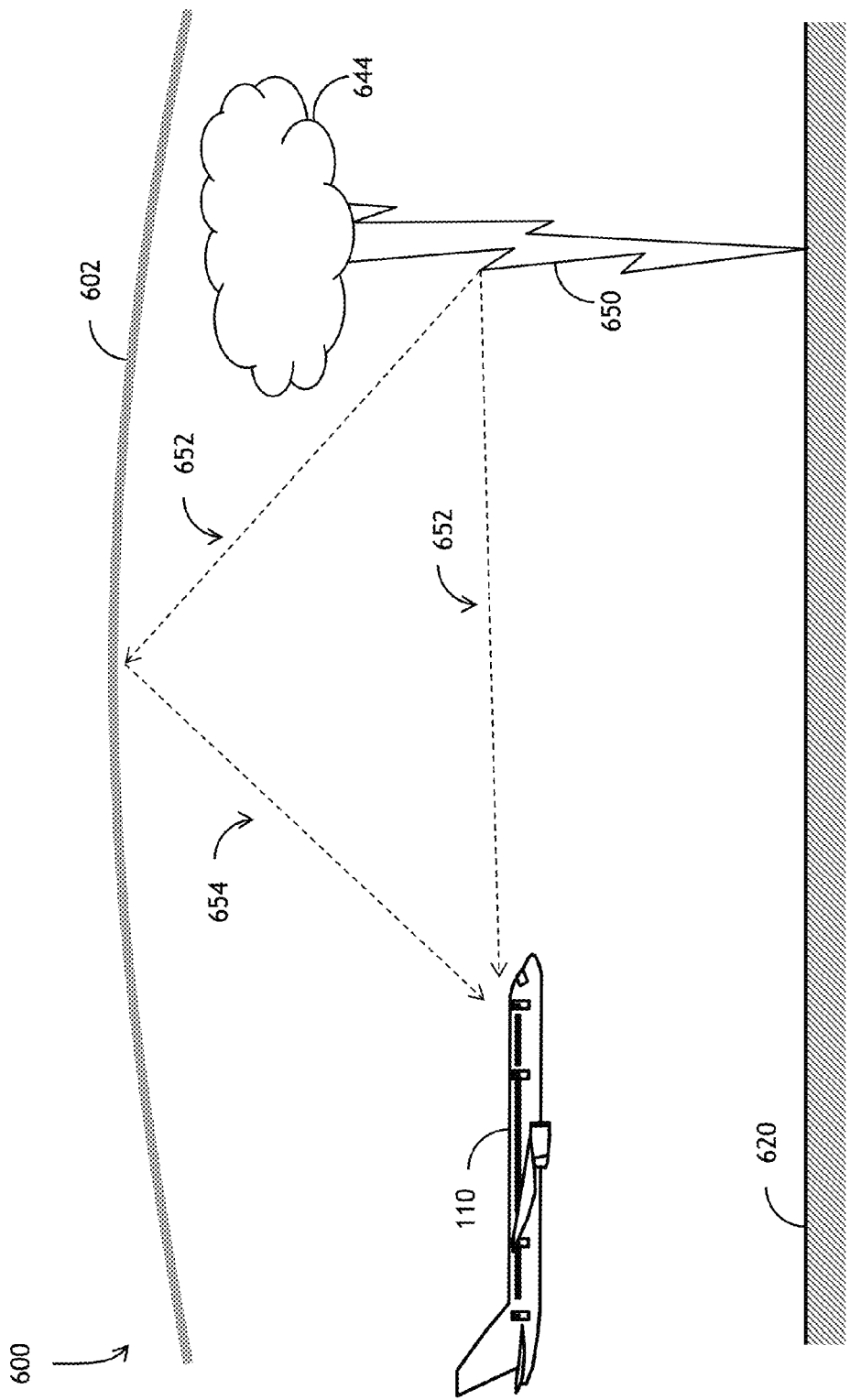
FIG. 6 is a diagram of a single vehicle with multiple antenna elements exemplary of one embodiment of the present invention.

Referring to FIG. 6, a diagram of a single vehicle with multiple antenna elements exemplary of one embodiment of the present invention is shown. Vehicle 110 may be fitted with a plurality of antenna elements capable of receiving a plurality of frequencies. In many phases of flight, antenna elements may be idle and remain unused. Embodiments of the present invention may employ these unused antenna elements for purposes of geolocation of the remote emitter. Here, a lightning strike 650 may be one remote emitter requiring geolocation capable by embodiments of the present invention. Possibly embedded within weather clouds 644, lightning strike 650 is one emitter system 400 may locate relative to the vehicle 110.

U.S. Pat. No. 7,782,247 to VanLaningham teaches coordinated radio frequency signal reception from a distributed network of transceivers to detect and track targets and is incorporated herein by reference in its entirety.

VanLaningham teaches a method of estimating the position of one or more target nodes based on received reflections of a primary signal. The method includes receiving a primary signal from a transmitter node having a known location at a receiver node having a known location and receiving at least one reflected signal at the receiver node, the reflected signal generated by a reflection of the primary signal by a target node having an unknown location. The method further includes applying a target position algorithm to the primary signal and the at least one reflected signal to generate echo delay information, receiving echo delay information from at least one other transmitter and/or receiver node, and determining a centroid value for the generated echo delay information and the received echo delay information. The method yet further includes applying an estimation filter to the centroid value to generate target location information.

VanLaningham teaches an inverse transform output hereinafter "the Spectmur algorithm" output is the output generated by an algorithm to take the inverse transform of a compressed signal spectrum to generate echo delay information based on received replicants of a direct path signal. An exemplary Spectmur output plot includes one or more Spectmur peaks, the distance between which is representative of the difference in path length between a direct path signal and a reflected path signal.

VanLaningham teaches the processed Spectmur output may be used to calculate the Spectmur Equivalent Length Difference (SELD) equal to the difference in path length between the primary and secondary signals. The SELD may be computed using the equation:

$$\text{SELD} = \tau_m c \text{ where } m = 0, 1, \ldots, N \quad (3)$$

Where $\tau_m$ is the delay in the mth secondary path (with m=0 as the primary path with $\tau_m$=0 and c is the propagation velocity of the RF signal.) Equation 1 assumes a measurable length between the transmitting and receiving platform. The greater the number of nodes, the more accurate the target position data that can be generated.

For a single transmit and receive pair, assuming that the transmitting (emitter) position Ex,y,z and the receiver position Rx,y,z are known, the SELD may be computed by the Equation:

$$\text{SELD} = \text{DTE} + \text{DTR} - \text{DER} = (Ex-Tx)2 + (Ey-Ty)2 + (Ez-Tz)2 + (Rx-Tx)2 + (Ry-Ty)2 + (Rz-Tz)2 - (Ex-Rx)2 + (Ey-Ry)2 + (Ez-Rz) \quad (4)$$

Where DTE is equal to the distance between the target and the emitter, DTR is the distance between the target and the receiver and DER is the distance between the emitter and the receiver. This equation produces a surface of potential solutions for the target position. The unknowns of this equation are the target positions Tx, Ty, and Tz. Since there is one equation and three unknowns, the target position cannot be determined using this single observation.

For a three dimensional target position determination with three SELD measurements, second and third receivers are added such that the target position can be resolved to a point in space. The SELD may be computed by the Equations:

$$\text{SELD1} = \text{DTE} + \text{DTR1} - \text{DER1} = (Ex-Tx)2 + (Ey-Ty)2 + (Ez-Tz)2 + (R1x-Tx)2 + (R1y-Ty)2 + (R1z-Tz)2 - (Ex-R1x)2 + (Ey-R1y)2 + (Ez-R1z)$$
$$2\text{SELD2} = \text{DTE} + \text{DTR2} - \text{DER2} = (Ex-Tx)2 + (Ey-Ty)2 + (Ez-Tz)2 + (R2x-Tx)2 + (R2y-Ty)2 + (R2z-Tz)2 - (Ex-R2x)2 + (Ey-R2y)2 + (Ez-R2z)$$
$$2\text{SELD3} = \text{DTE} + \text{DTR3} - \text{DER3} = (Ex-Tx)2 + (Ey-Ty)2 + (Ez-Tz)2 + (R3x-Tx)2 + (R3y-Ty)2 + (R3z-Tz)2 - (Ex-R3x)2 + (Ey-R3y)2 + (Ez-R3z) \quad (5)$$

Since there are three equations and three unknowns, system 400 may determine the target position using this observation.

Again, VanLaningham teaches additional antennas mounted on a vehicle for reception of the primary signal and the reflected signal. Embodiments of the present invention may locate the emitter 150 based on a direct signal 652 and a reflected signal 654 however, unlike VanLaningham, the present invention employs antenna elements on the vehicle 110 previously mounted on the vehicle for a purpose other than geolocation.

Direct signal 652 may arrive at vehicle 110 at a first time while reflected signal 654 may arrive at a later time. One desired reflector may include the ionosphere. Embodiments of the present invention may employ redundant antenna elements onboard the vehicle 110 to receive a direct signal 652 from the remote emitter 650 as well as a reflected signal 654 from a known reflector 602. Here, the ionosphere is the desired reflector 602 capable of reflecting the direct signal 652.

Many well-known capabilities exist for establishing an altitude for the ionosphere as a known reflector 602. For example, common weather reporting data may include a day and night altitude of the ionosphere. System 400 may use these inputs to determine a geolocation of emitter lightning strike 650.

Specific reflector properties may determine reflection capabilities. For example, a cloud to ground lightning strike 650 may possess a stronger HF signal than other lightning types. System 400 may receive not only the direct signal 652 from the cloud to ground lightning strike 650 but also the HF reflected signal 654 from the ionosphere reflector 602.

Figure 7:
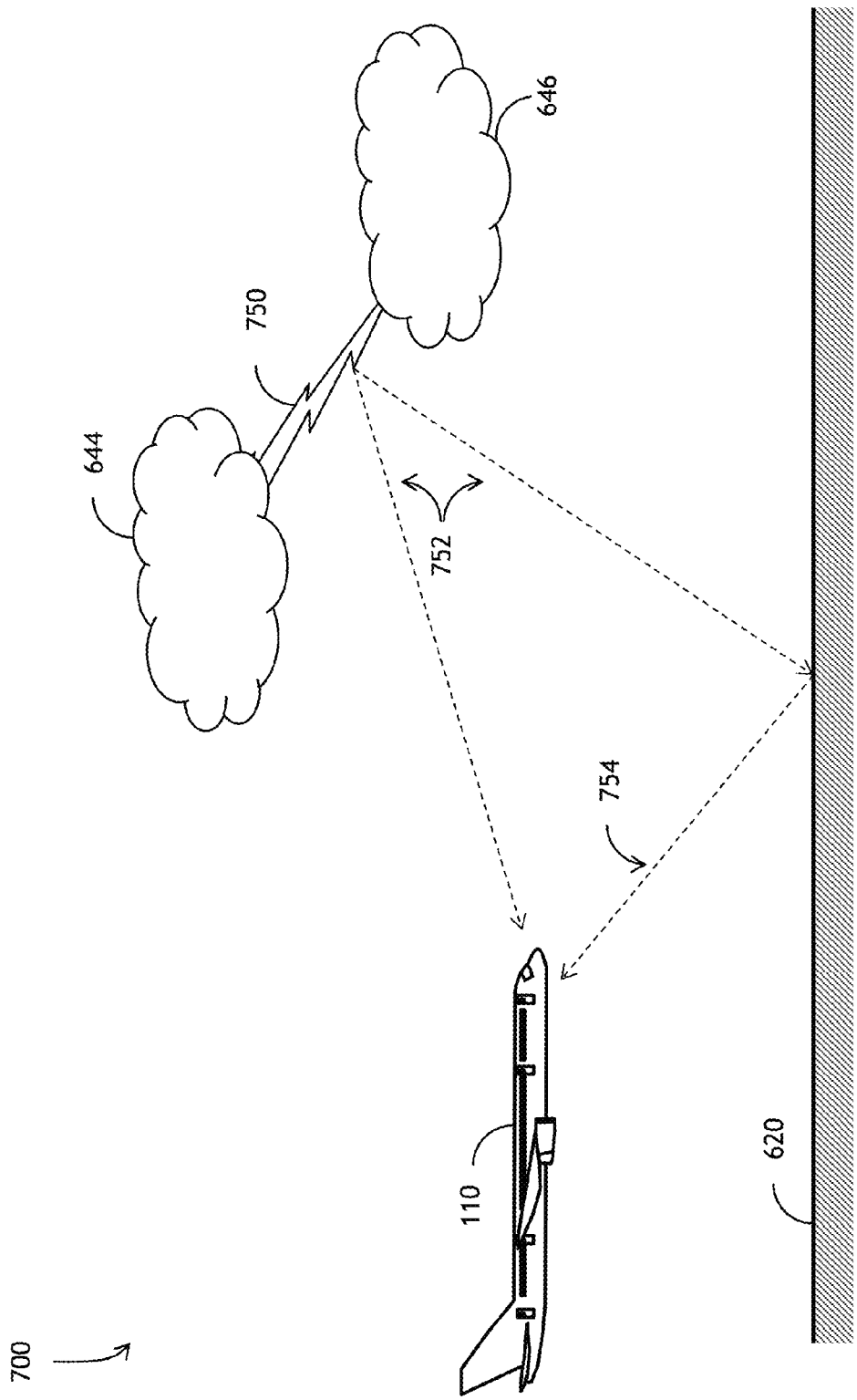
FIG. 7 is a diagram of a single vehicle with multiple antenna elements exemplary of an embodiment of the present invention.

Referring to FIG. 7, a diagram of a single vehicle with multiple antenna elements exemplary of an embodiment of the present invention is shown. Similar to the ionosphere reflection, the surface of the earth 620 may also act as the reflector. In a cloud 644 to cloud 646 lightning strike 750, a VHF frequency may be the primary emission from the cloud to cloud strike 750. System 400 may receive the direct signal 752 followed by the reflected signal 754 to determine a SELD information to determine range coupled with the angle of reception of the direct signal 753 to determine bearing. Here reflector 602 may be the surface of the earth where water may better reflect a VHF signal. It is further contemplated herein, a plurality of desirable reflectors 620 may be used to reflect the direct signal 752 to create reflected signal 754.

Figure 8:
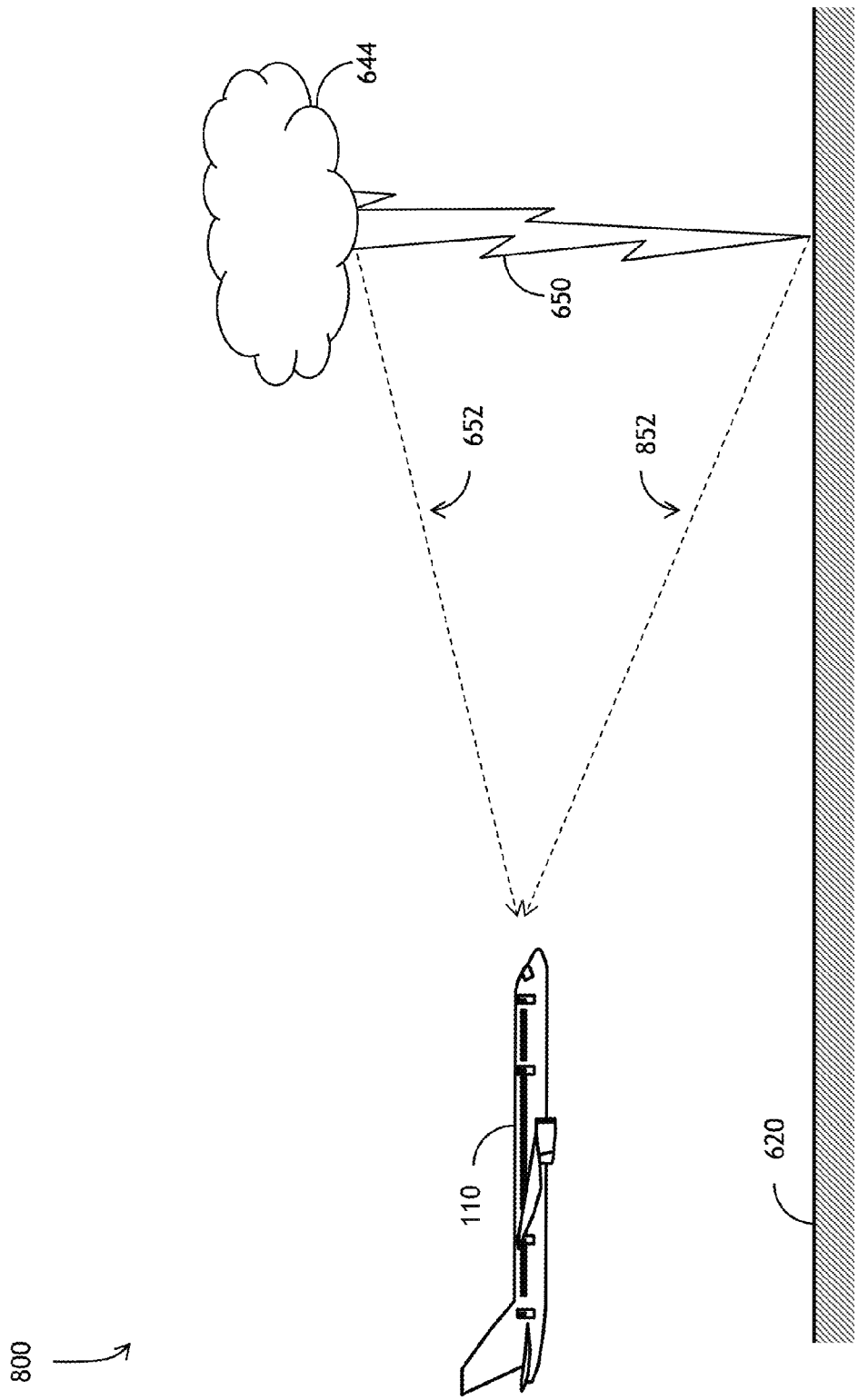
FIG. 8 is a diagram of a single vehicle with multiple antenna elements exemplary of an embodiment of the present invention.

Referring to FIG. 8, a diagram of a single vehicle with multiple antenna elements exemplary of an embodiment of the present invention is shown. Additional embodiments of the present invention may also determine a length of the lightning strike 650. Using a time and power difference of arrival, system 400 may determine a distance from the lightning strike 650 using RF emission time and power differences (ΔP). For example, as power decreases with range, a specific power level received a the vehicle may indicate a specific range for the lightning strike 650.

Embodiments of the present invention may further determine a length of the lightning strike 650. Using a time difference (ΔT) between a first lightning strike 650 emission 652 (T1, P1) and a final lightning strike emission 852 (T2, P2), system 400 may determine the length of lightning strike. Further contemplated herein, system 400 may use ΔP (P1−P2) and ΔT (T2−T1) to determine an orientation of lightning strike 650 relative to the vehicle 110.

Method 800 may be combined with additional embodiments of the present invention to increase accuracy of measurements. For example, method 800 combined with a weather radar for system lightning detection or with a system 400 angle of arrival determiner to accurately locate a lightning strike 650.

Figure 9:
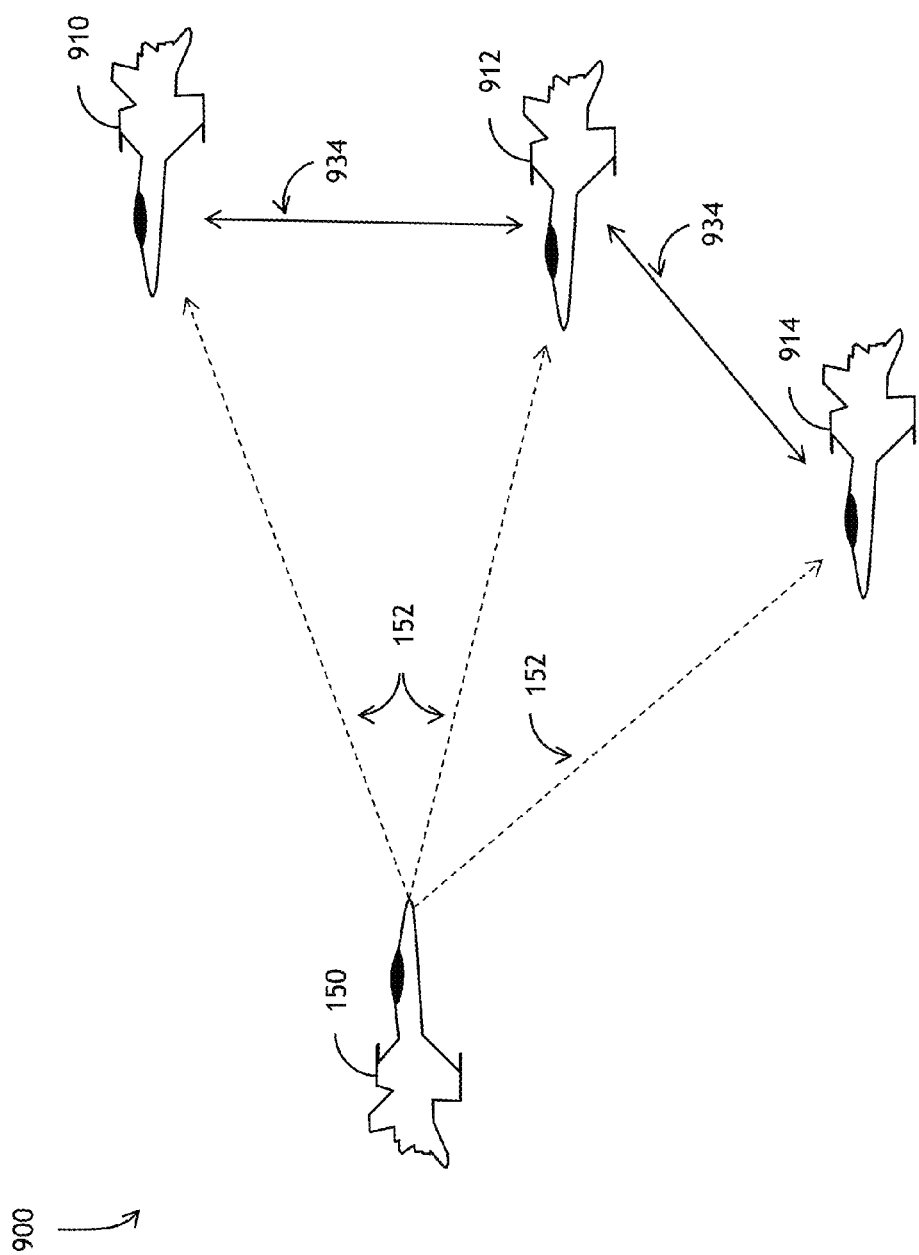
FIG. 9 is a diagram of multiple vehicles with multiple antenna elements exemplary of an embodiment of the present invention.

Referring to FIG. 9, a diagram of multiple vehicles with multiple antenna elements exemplary of an embodiment of the present invention is shown. Multiple antenna elements on each vehicle may produce a geolocation solution for each vehicle. As multiple vehicles may be combined through an exchange of information via data link 934, location accuracy may increase. Aircraft vehicles 910 912 914 may each present a geolocation solution wherein an average or lease squares method may realize greater accuracy than a single geolocation solution.

Embodiments of the present invention may incorporate a plurality of well-known methods of location using the antenna elements onboard the vehicle 110 including, but not limited to: TDOA, a Frequency Difference of Arrival (FDOA), a Doppler Difference of Arrival (DDOA), a phase interferometer, a Frequency Difference Interferometer, SPECTMUR, CEPSTRUM, and Power Difference of Arrival (PDOA) to increase accuracy of the emitter 150 location.

Figure 10:
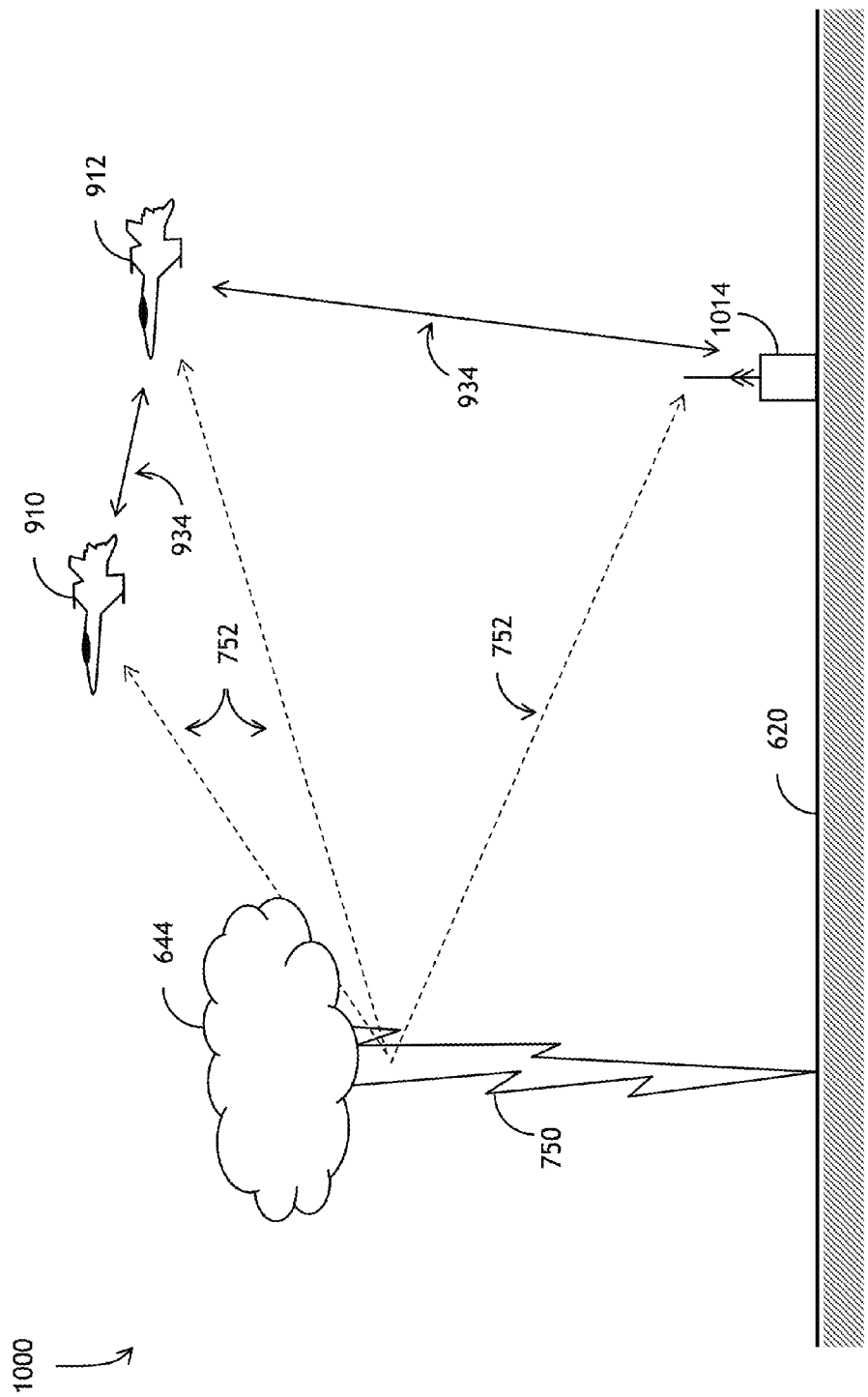
FIG. 10 is a diagram of multiple vehicles with multiple antenna elements exemplary of an embodiment of the present invention.

Referring to FIG. 10, a diagram of multiple vehicles with multiple antenna elements exemplary of an embodiment of the present invention is shown. Multiple vehicles including a ground station 1014 coupled via data link 934 may act within the scope of the present invention to increase the accuracy of the geolocation solution.

Figure 11:
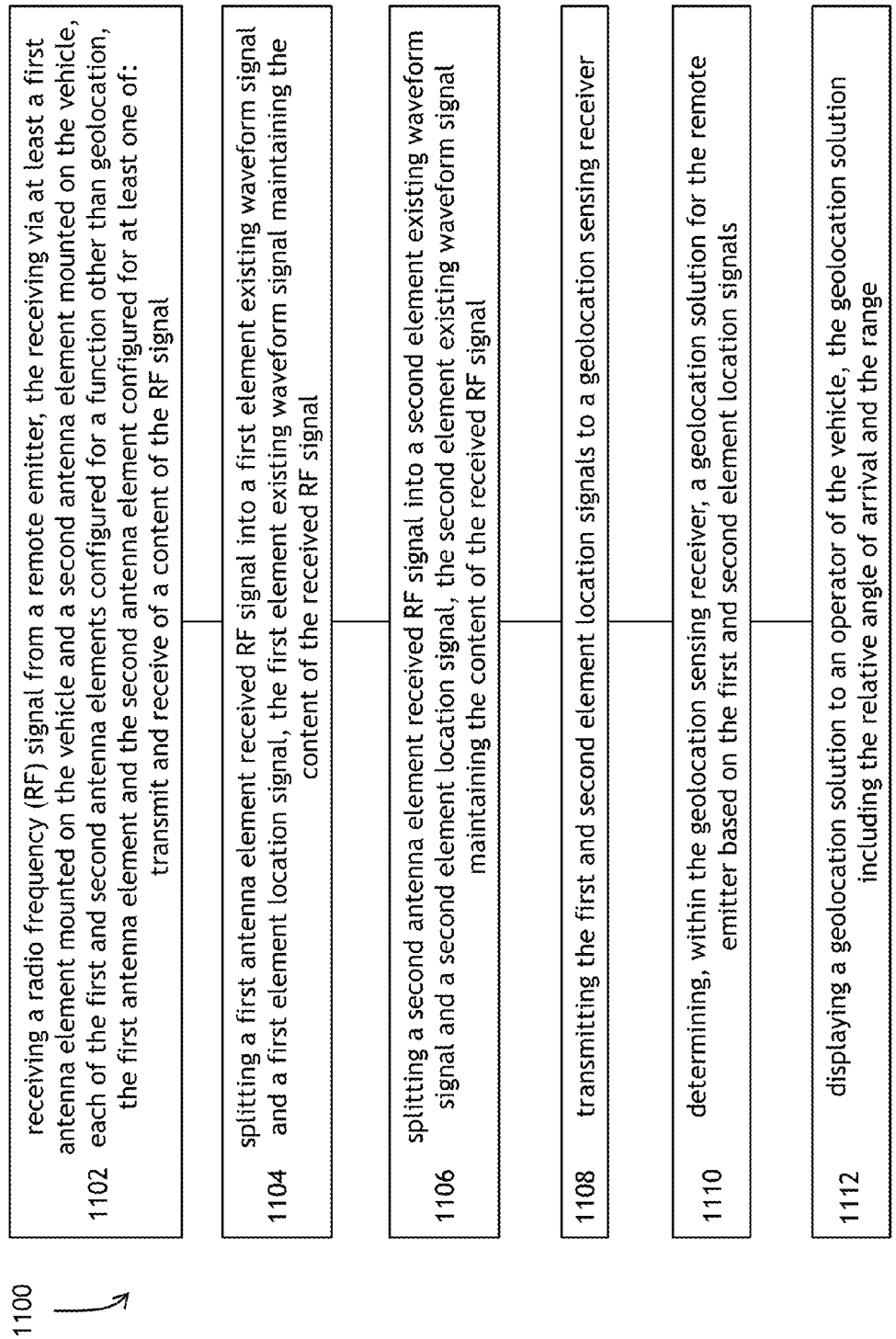
FIG. 11 is a flowchart for a method for geolocation using currently mounted antenna elements onboard a vehicle in accordance with one embodiment of the present invention.

Referring to FIG. 11, a flowchart for a method for geolocation using currently mounted antenna elements onboard a vehicle in accordance with one embodiment of the present invention is shown. Method 1100 may begin with step 1102, with receiving a radio frequency (RF) signal from a remote emitter, the receiving via at least a first antenna element mounted on the vehicle and a second antenna element mounted on the vehicle, each of the first and second antenna elements configured for a function other than geolocation, the first antenna element and the second antenna element configured for at least one of: transmit and receive of a content of the RF signal, and at step 1104, with splitting a first antenna element received RF signal into a first element existing waveform signal and a first element location signal, the first element existing waveform signal maintaining the content of the received RF signal, and at step 1106, with splitting a second antenna element received RF signal into a second element existing waveform signal and a second element location signal, the second element existing waveform signal maintaining the content of the received RF signal, and at step 1108, with transmitting the first and second element location signals to a geolocation sensing receiver, and at step 1110, with determining, within the geolocation sensing receiver, a geolocation solution for the remote emitter based on the first and second element location signals, and, method 1100 may conclude at step 1112, with displaying a geolocation solution to an operator of the vehicle.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for geolocation using currently mounted antenna elements onboard a vehicle, comprising:
   receiving a radio frequency (RF) signal from a remote emitter, the receiving via at least a first antenna element mounted on the vehicle and a second antenna element mounted on the vehicle, each of the first and second antenna elements configured for a function other than geolocation, the first antenna element and the second antenna element configured for at least one of: transmit and receive of a content of the RF signal;
   splitting a first antenna element received RF signal into a first element existing waveform signal and a first element location signal, the first element existing waveform signal maintaining the content of the received RF signal;
   splitting a second antenna element received RF signal into a second element existing waveform signal and a second element location signal, the second element existing waveform signal maintaining the content of the received RF signal;
   transmitting the first and second element location signals to a geolocation sensing receiver;
   determining, within the geolocation sensing receiver, a geolocation solution for the remote emitter based on the first element location signal and the second element location signal; and
   displaying the geolocation solution to an operator of the vehicle.

2. The method for geolocation using currently mounted antenna elements onboard a vehicle of claim 1, wherein the vehicle is an aircraft and the function other than geolocation includes at least one of: communication, navigation, and surveillance.

3. The method for geolocation using currently mounted antenna elements onboard a vehicle of claim 1, wherein determining a geolocation solution for the remote emitter further includes combining a geolocation solution from a first vehicle with a geolocation solution from at least one additional vehicle to create a third geolocation solution.

4. The method for geolocation using currently mounted antenna elements onboard a vehicle of claim 3, wherein the at least one additional vehicle includes one of: a ground based vehicle, a space based vehicle, and an airborne vehicle.

5. The method for geolocation using currently mounted antenna elements onboard a vehicle of claim 1, wherein the remote emitter includes at least one of: a remote vehicle, a lightning strike, and a remote ground based emitter.

6. The method for geolocation using currently mounted antenna elements onboard a vehicle of claim 1, wherein splitting the first and second antenna element received RF signal into a first and second element existing waveform signal and a first and second element location signal further includes at least one of an analog to digital conversion and a digital to analog conversion.

7. The method for geolocation using currently mounted antenna elements onboard a vehicle of claim 1, further comprising reception of a time reference and wherein determining the geolocation solution for the remote emitter is based on a combination of a phase interferometry solution and a time distance of arrival (TDOA) calculation.

8. The method for geolocation using currently mounted antenna elements onboard a vehicle of claim 1, wherein the geolocation solution for the remote emitter based on the first and second element location signals is determined by a combination of at least two geolocation solutions.

9. The method for geolocation using currently mounted antenna elements onboard a vehicle of claim 1, wherein the remote emitter is at least one ground based emitter, each of the at least one ground based emitter having a known location, and wherein the geolocation sensing receiver is further configured to determine a position of the vehicle based on the received RF signals.

10. The method for geolocation using currently mounted antenna elements onboard a vehicle of claim 1, wherein the geolocation sensing receiver is configured for receiving a frequency associated with one of a cloud to cloud lightning strike and a cloud to ground lightning strike.

11. A system for geolocation using currently mounted antenna elements onboard a vehicle, comprising:
   a first antenna element configured for a function other than geolocation, the first antenna element configured for at least one of: transmit and receive of a content of a Radio Frequency (RF) signal;
   a first splitter configured for splitting a first antenna element received RF signal into a first element existing waveform signal and a first element location signal, the first element existing waveform signal maintaining the content of the received RF signal, the first splitter further configured for transmitting the first element existing waveform signal to a receiver and for transmitting the first element location signal;

a second antenna element configured for a function other than geolocation, the second antenna element configured for at least one of: transmit and receive of the content of the RF signal;

a second splitter configured for splitting a second antenna element received RF signal into a second element existing waveform signal and a second element location signal, the second element existing waveform signal maintaining the content of the received RF signal, the second splitter further configured for transmitting the second element existing waveform signal to a receiver and for transmitting the second element location signal;

a geolocation sensing receiver configured for:
receiving each of the first element location signal and the second element location signal;
determining a geolocation solution for the remote emitter based on the first element location signal and the second element location signal; and
displaying the geolocation solution to an operator of the vehicle.

12. The system for geolocation using currently mounted antenna elements onboard a vehicle of claim 11, wherein the vehicle is an aircraft and the function other than geolocation includes at least one of: communication, navigation, and surveillance.

13. The system for geolocation using currently mounted antenna elements onboard a vehicle of claim 11, wherein determining the geolocation solution for the remote emitter further includes combining a geolocation solution from a first vehicle with a geolocation solution from at least one additional vehicle to create a third geolocation solution.

14. The system for geolocation using currently mounted antenna elements onboard a vehicle of claim 13, wherein the at least one additional vehicle includes one of: a ground based vehicle, a space based vehicle, and an airborne vehicle.

15. The system for geolocation using currently mounted antenna elements onboard a vehicle of claim 11, wherein the remote emitter includes at least one of: a remote vehicle, a lightning strike, and a remote ground based emitter.

16. The system for geolocation using currently mounted antenna elements onboard a vehicle of claim 11, wherein splitting the first and second antenna element received RF signal into a first and second element existing waveform signal and a first and second element location signal further includes at least one of an analog to digital conversion and a digital to analog conversion.

17. The system for geolocation using currently mounted antenna elements onboard a vehicle of claim 11, further comprising reception of a time reference and wherein determining the geolocation solution for the remote emitter is based on a combination of a phase interferometry solution and a time distance of arrival (TDOA) calculation.

18. The system for geolocation using currently mounted antenna elements onboard a vehicle of claim 11, wherein the geolocation solution for the remote emitter based on the first and second element location signals is determined by a combination of at least two geolocation solutions.

19. The system for geolocation using currently mounted antenna elements onboard a vehicle of claim 11, wherein the remote emitter is at least one ground based emitter, each of the at least one ground based emitter having a known location, and wherein the geolocation sensing receiver is further configured to determine a position of the vehicle based on the received RF signals.

20. The system for geolocation using currently mounted antenna elements onboard a vehicle of claim 11, wherein the geolocation sensing receiver is configured for receiving a frequency associated with one of a cloud to cloud lightning strike and a cloud to ground lightning strike.

21. A system for geolocation using currently mounted antenna elements onboard a vehicle, comprising:
receiving a first radio frequency (RF) signal from a remote emitter at a first time, the first RF signal having a first power, the receiving via at least a first antenna element mounted on the vehicle and a second antenna element mounted on the vehicle, each of the first and second antenna elements configured for a function other than geolocation, the first antenna element and the second antenna element configured for at least one of: transmit and receive of a content of the RF signal;
receiving a second RF signal from the remote emitter at a second time, the second RF signal having a second power;
transmitting the first RF signal and second RF signal to a geolocation sensing receiver;
determining a range from the vehicle to the remote emitter based on a Power Difference of Arrival (PDOA) between the first RF signal and the second RF signal; and
displaying the range to an operator of the vehicle.

22. The method for geolocation using currently mounted antenna elements onboard a vehicle of claim 21, wherein the first RF signal is a direct signal from a first end of a lightning strike and the second RF signal is a direct signal from a second end of the lightning strike.

23. The method for geolocation using currently mounted antenna elements onboard a vehicle of claim 22, wherein determining a range from the vehicle to the remote emitter further includes determining an orientation of the emitter based on a Time Difference of Arrival (TDOA) between the first RF signal and the second RF signal.

24. A method for geolocation using currently mounted antenna elements onboard a vehicle, comprising:
means for receiving a radio frequency (RF) signal from a remote emitter, each of the receiving means configured for a function other than geolocation, each of the receiving means configured for at least one of: transmit and receive of a content of the RF signal;
means for splitting a first antenna element received RF signal into a first element existing waveform signal and a first element location signal, the first element existing waveform signal maintaining the content of the received RF signal;
means for splitting a second antenna element received RF signal into a second element existing waveform signal and a second element location signal, the second element existing waveform signal maintaining the content of the received RF signal;
means for transmitting the first and second element location signals to a geolocation sensing receiver;
means for determining a geolocation solution for the remote emitter based on the first element location signal and the second element location signal; and
means for displaying the geolocation solution to an operator of the vehicle.

* * * * *